INVENTOR.
DAVID A. EHRENFELD
BY D. L. Leslie
G. T. McCoy
ATTORNEYS

INVENTOR.
DAVID A. EHRENFELD
BY D.E. Leslie
Agent & Co.
ATTORNEYS

Feb. 18, 1969 JAMES E. WEBB 3,428,761
ADMINISTRATOR OF THE NATIONAL AERONAUTICS
AND SPACE ADMINISTRATION
EXCITATION AND DETECTION CIRCUITRY FOR A FLUX
RESPONSIVE MAGNETIC HEAD
Filed April 26, 1966 Sheet 3 of 4

INVENTOR.
DAVID A. EHRENFELD
BY D E Leslie
G Fms & Cary
ATTORNEYS

INVENTOR.
DAVID A. EHRENFELD
BY D E Leslie
G. T. McCoy
ATTORNEYS

United States Patent Office 3,428,761

Patented Feb. 18, 1969

3,428,761

EXCITATION AND DETECTION CIRCUITRY FOR A FLUX RESPONSIVE MAGNETIC HEAD

James E. Webb, Administrator of the National Aeronautics and Space Administration with respect to an invention of David A. Ehrenfeld, Pasadena, Calif.

Filed Apr. 26, 1966, Ser. No. 546,142

U.S. Cl. 179—100.2 10 Claims

Int. Cl. G11b 5/24, 5/30

The invention described herein was made in the performance of work under a NASA contract and is subject to the provisions of Section 305 of the National Aeronautics and Space Act of 1958, Public Law 85–568 (72 Stat. 435; 42 USC 2457).

The present invention relates to recording circuitry and more particularly to circuitry for use with a flux respnosive magnetic readout head.

The development of the flux responsive magnetic head has opened up a new approach to utilizing magnetic data such as may be recorded on a magnetic tape. The use of a FRMH (flux responsive magnetic head) allows the recorded data or information to be read out at low speed and even at zero speed. Recorded data is more reliably read out at low speed since the FRMH has a larger output voltage than ordinary $d\phi/dt$ heads, at low tape speeds. Throughout the record and reproduce cycle, the flux responsive system preserves the phase relationship and the reproduced magnitude of the recorded flux, rather than the differentiated flux, as is the case in conventional reproducing magnetic heads.

Basically, a FRMH is a core-like magnetic head with a gap positioned near the moving tape on which the information is recorded in the form of magnetic flux. A modulation or excitation winding for provding a relatively high frequency, such as 50 kc. current, is wound about the core. The current is sufficiently large to saturate the core at least once per excitation cycle. Some source of DC bias current is used to produce a continuous DC current in the excitation winding such that during one-half of each modulation or excitation cycle, the core is saturated while during the other half the core is unsaturated. When the core is driven to saturation by the excitation current, flux stored on the tape near the gap cannot couple or affect a signal induced in the signal winding wound about the core. However saturation will occur at slightly different times depending on whether the tape flux is aiding or opposing the effect of the current in the excitation winding in saturating the core. It is these time differences between the times that the core saturates that are detected to reconstruct the orginal information or data stored in the tape.

Though the fields of application of FRMH appear to be many, the high AC excitation power, poor signal-to-noise ratio, and DC bias needed to properly excite or modulate and bias the head have so far limited the use of such a head. However, in applications in which low power requirements are a major design criteria such as for spacecraft application, FRMH have far found the most limited use.

Thus a need exists for a low power excitation circuitry for use with a FRMH.

Accordingly, it is an object of the present invention to provide a novel excitation circuit for use with a FRMH.

Still a further object is to provide a low power excitation and detection circuit for a flux responsive magnetic head without the need for a separate source of DC bias current needed in the prior art arrangements.

A further object is the provision of a new circuit which will improve the signal-to-noise ratio of a FRMH.

These and other objects are achieved by providing an excitation circuit whereby a FRMH is excited with an AC excitation current during only a predetermined portion of each cycle of a selected sampling frequency. Consequently the head instead of being excited continuously is only excited during fixed excitation periods hereafter also referred to as sampling periods which occur at the preselected sampling frequency. Since the excitation is not continuous, the total excitation power which is required is greatly reduced over prior art arrangements. In addition the circuitry includes a novel arrangement whereby at the end of each sampling period, the saturation state at which the head is left is the same so that the need for a separate DC bias source is eliminated. It has been found that by employing the teachings of the invention, hereafter described in detail, the power requirements can be reduced by a factor of at least fifty, with a minimum increase in circuitry. The low power excitation and detection circuitry of the present invention is particularly useful in applications where its low power requirements are most advantageous such as in spacecrafts or other applications where the sources of power are quite limited.

In addition, the present invention features an improvement in signal-to-noise ratio when compared with all other known methods of operating flux responsive magnetic heads. This feature is thereafter referred to as AC bias.

The novel features that are considered characteristic of this invention as set forth with particularity in the appended claims. The invention itself both as to its organization and method of operation, as well as additional objects and advantages thereof, will best be understood from the following description when read in connection with the accompanying drawings, in which:

Figure 4A:
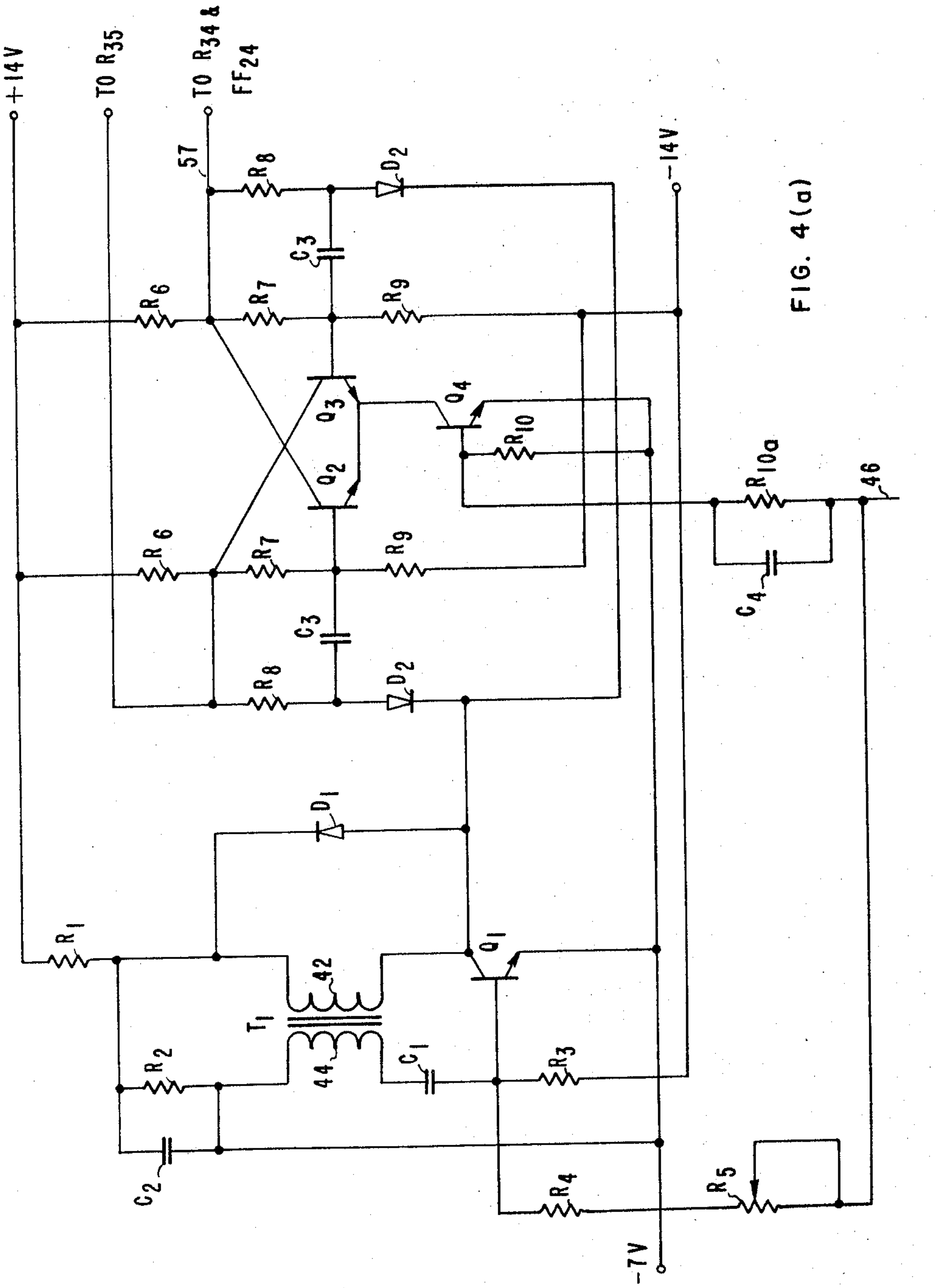
Figure 4B:
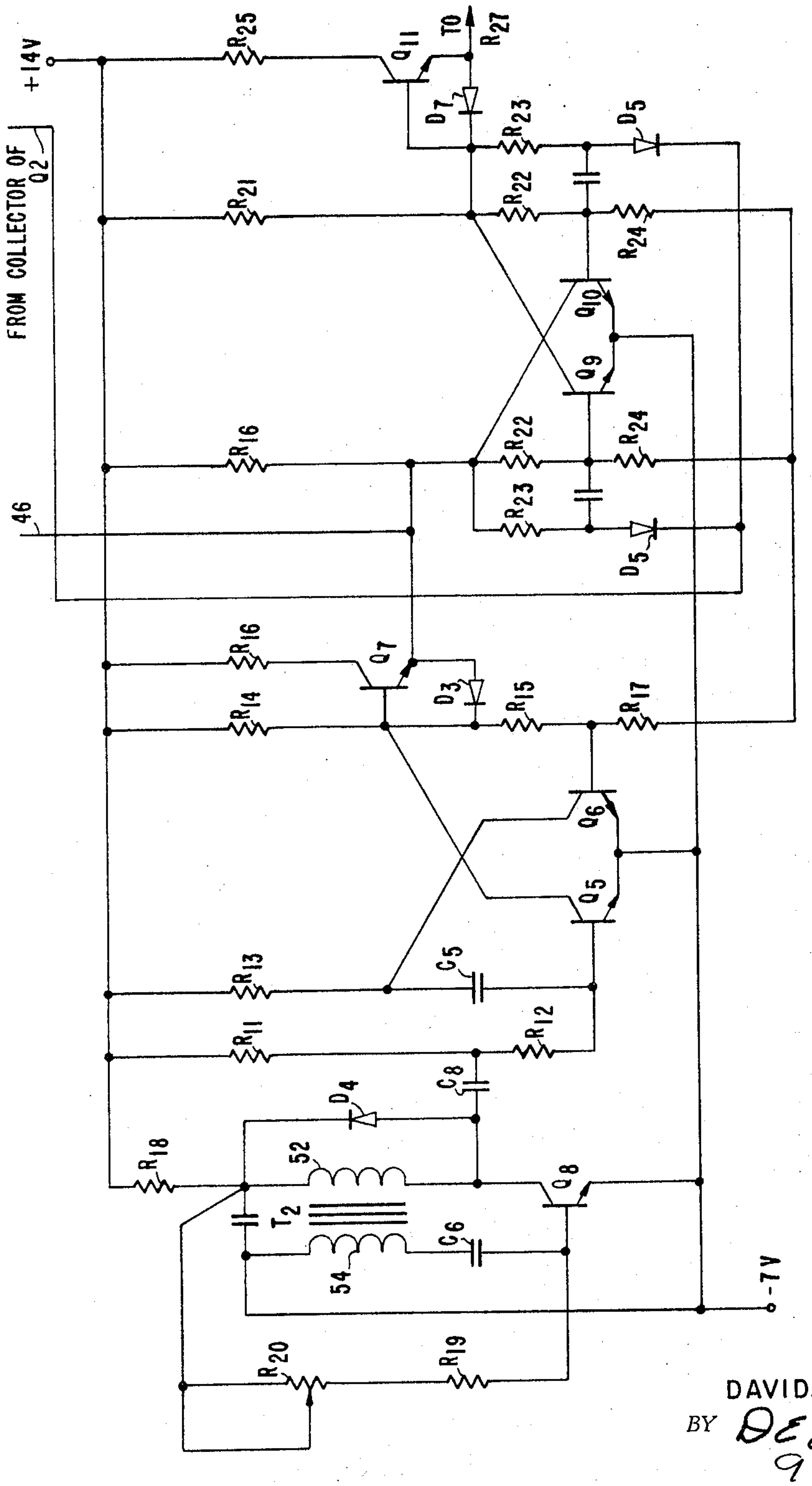
Figure 5:
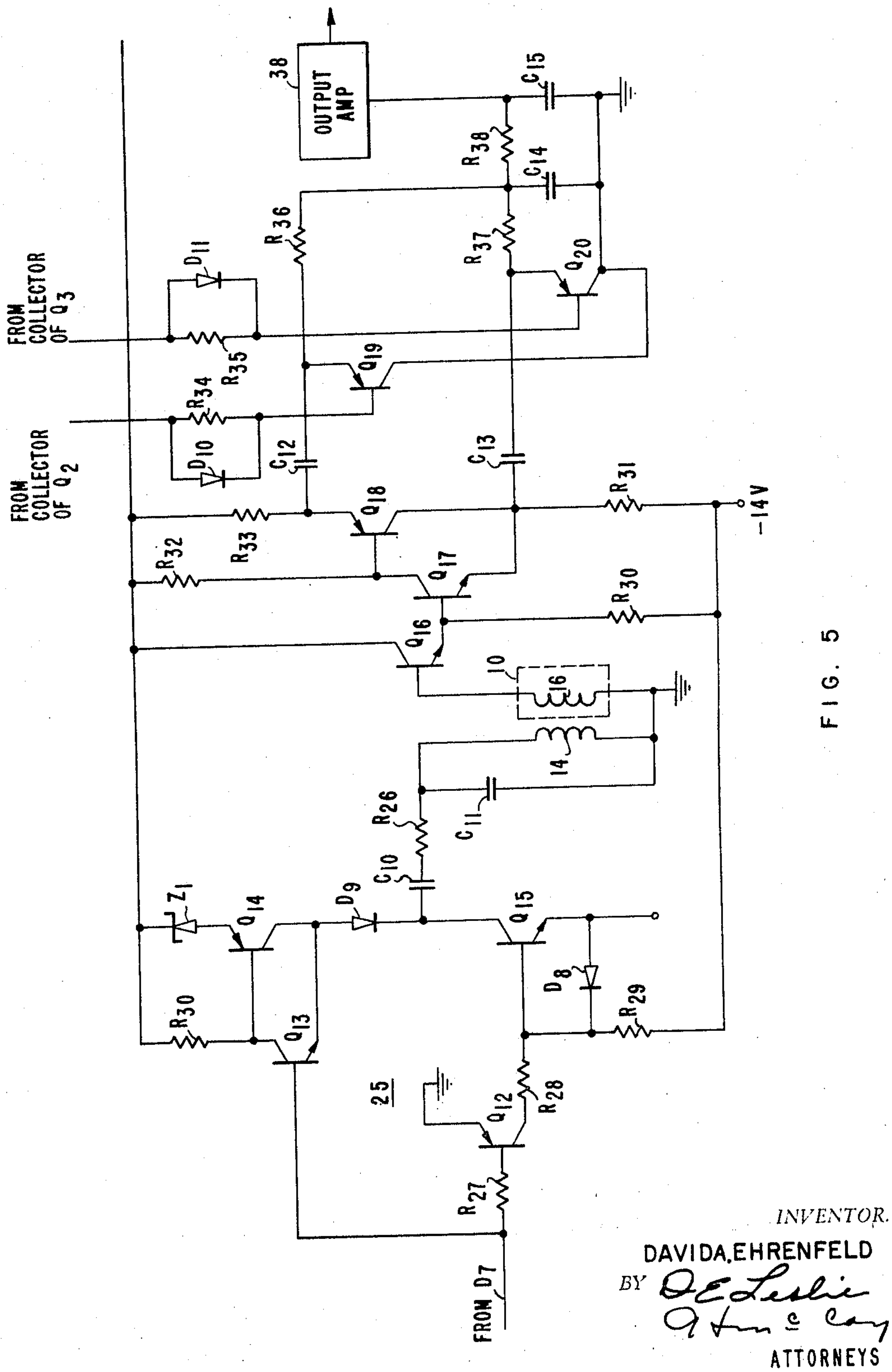

FIGURES 4*a* and 4*b* are schematic diagrams of portions of the circuitry of the invention; and FIGURE 5 is a schematic diagram of another portion of the novel circuitry.

Figure 1:
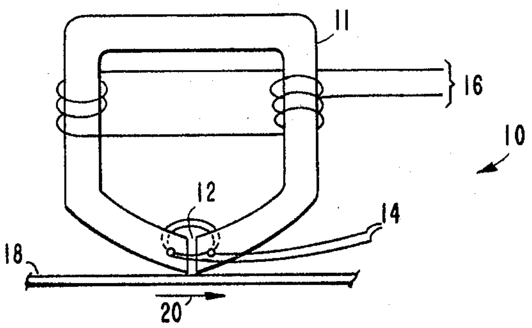
FIGURE 1 is a diagram of a flux responsive magnetic head.

Attention is first directed to FIGURE 1 which is a simplified diagram of a flux responsive magnetic head 10 shown comprising a core 11 defining a gap 12. An excitation winding 14 is shown wound about the core adjacent to the gap while an output winding 16 is shown wound about the core 11. In addition, in FIGURE 1, a magnetic member such as magnetic tape 18 in which data or information is stored in the form of magnetic flux, is shown adjacent gap 12. As is appreciated by those familiar with the art of magnetic recording, and in particular the use of flux responsive magnetic heads in such recordings, by exciting the head 10 by means of an excitation current in winding 14, an output signal is produced in winding 16 which is the function of the magnetic flux in tape 18 adjacent gap 12, rather than a function of the rate of change of flux in the tape 18 as the tape passes by the gap 12 in a predetermined direction such as indicated by arrow 20.

Briefly described, a fairly large current of approximately 70 milliamperes (ma.) peak is caused to flow in the excitation winding 14 at a substantially high frequency, such as 50 kc. This current is sufficiently large to saturate the core 11 at least once per excitation cycle. Conventionally, a DC bias current through the excitation winding 14 is provided so that during one-half of the excitation cycle, the core is saturated and during the other half, the core is brought out of magnetic saturation. When the core is saturated, magnetic flux stored in tape 12 cannot couple into the output winding 16 through the gap 12. However, depending on the magnitude and polarity of the magnetic flux in the tape, such magnetic flux will either aid or oppose the saturation of the core. Thus the point during each excitation cycle when the core is saturated depends on the polarity and magnitude of the flux in the tape. These time differences at which the core is saturated result in output signals which are detectable in the output winding 16. These signals are a function of the magnitude and polarity of the magnetic flux stored in the tape rather than the rate of change of flux therein.

Figure 2:
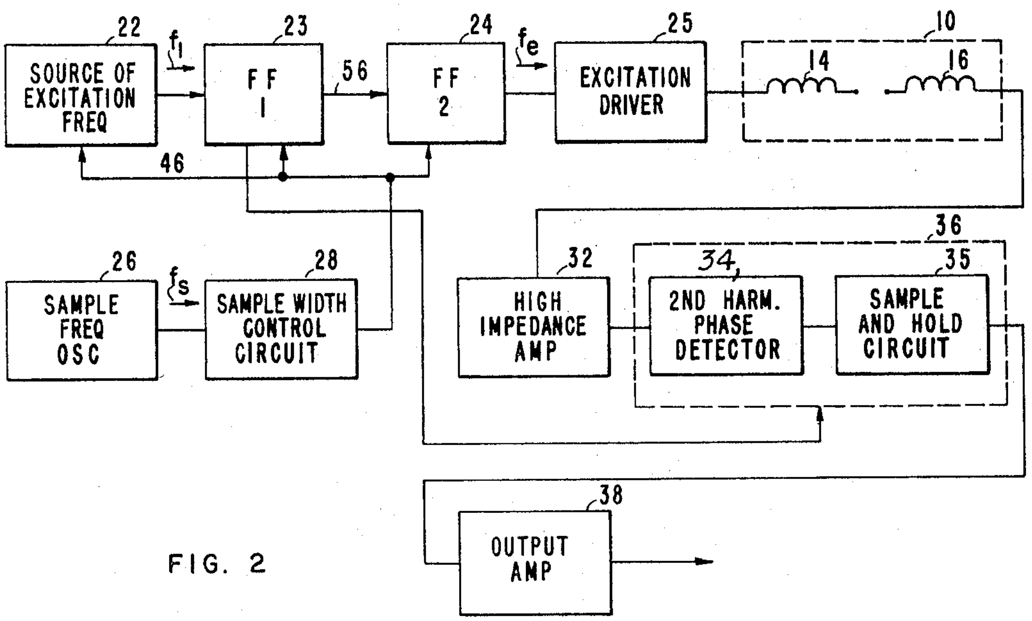
FIGURE 2 is a block diagram of the circuitry of the present invention.
Figure 3:
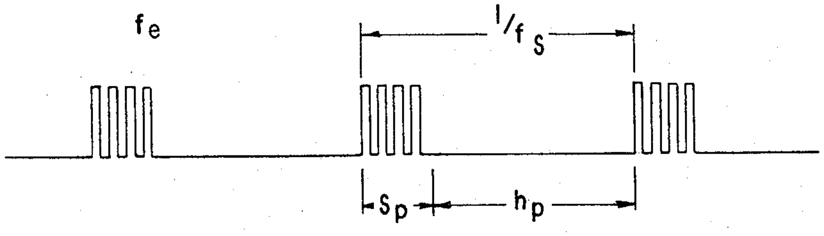
FIGURE 3 is a waveform diagram useful in explaining the novel teachings of the invention.

As previously indicated in prior art circuitry for exciting a flux responsive magnetic head, the excitation current was continuously supplied to the excitation winding thereof and in addition a source of DC bias current was required to provide the necessary DC biasing for the magnetic head. Thus the power requirement of such circuits are quite significant, often exceeding the power availability in systems where low power requirements are a major design criteria. In accordance with the teachings of the present invention, however, the excitation current is supplied to the excitation winding 14 only during discrete sampling periods occurring at a preselected sampling rate. For a better understanding of the novel teachings of the invention, reference is made to FIGURES 2 and 3. FIGURE 2 is a block diagram of the low power excitation and detection circuitry of the present invention, while FIGURE 3 is a waveform diagram useful in explaining the noncontinuous excitation technique employed in the circuit of FIGURE 2.

As seen from FIGURE 2, the circuit includes a source of excitation frequency 22 which provides an output signal of a frequency $f_1$. Frequency $f_1$ is then supplied through serially connected flip-flops 23 and 24, with the output of flip-flop 24 being a square waveshaped signal of a frequency $f_e$ where $f_e$ is equal to $f_1/4$. The signal of frequency $f_e$ is then supplied to the excitation winding 14 of head 10 through an excitation driver 25. However, whereas in the prior art arrangement, the excitation signal if continuously supplied to the excitation winding, as seen from FIGURE 3, in accordance with the teachings of the present invention, the excitation signal of frequency $f_e$ hereafter also referred to as the excitation frequency $f_e$, is only supplied during discrete sampling periods designated as $s_p$. To define such sampling periods, the circuit includes a sample frequency oscillator 26 which provides a signal of frequency $f_s$, so that the period or duration of each cycle of the signal from oscillator 26 is $1/f_s$.

The output of oscillator 26 is supplied to a sample width control circuit 28 which in a sense divides the period of each cycle of the signal from oscillator 26 into the sample period and a hold period whereby $s_p+h_p=1/f_s$. At the end of each sampling period $s_p$, a signal is provided by control circuit 28 inhibiting flip-flop 23 from transmitting signals to flip-flop 24, as well as controlling flip-flop 24 to remain in a particular one of its two stable states. Thus, at the end of each sample period, the excitation winding 14 is provided with the same signal so that at the end of the period, the core 11 (FIGURE 1) is maintained in the same state of magnetic saturation. For example, in accordance with the teachings of the invention, the flip-flop 24 is maintained in a flop state, driving the core 11 to be magnetically saturated so that during a succeeding sampling period, the excitation signal $f_e$ brings the core out of saturation once each cycle of the excitation frequency. Thus, the effect of a DC bias current is accomplished without the use of a separate DC bias source.

As seen from FIGURE 2, the novel circuitry of the present invention also includes a detection circuit which comprises a high impedance amplifier 32 coupled to the output winding 16 of head 10. The output of amplifier 32 is supplied to a second harmonic phase detector 34 and a sample and hold circuit 35 which together may be thought of as comprising an output detection circuit 36. The output of the sample and hold circuit 35 is supplied to an output amplifier 38, the output of which comprises the output signal of the circuit which may be used by a digital data reconstruct circuit to reconstruct the digital data when such information is stored on the magnetic tape 18.

As seen from FIGURE 2, flip-flop 23 is connected to the detection circuit 36 so that at the end of each sampling period $s_p$, when flip-flop 23 is inhibited or deactivated by the sample width control circuit 28, flip-flop 23 in turn deactivates the detection circuit 36 so that the signal sampled by the sample and hold circuit 35 remains unaltered until the succeeding sampling period during which the magnetic head 10 is again excited by the excitation frequency $f_e$ to sense the polarity and magnitude of the magnetic flux in the tape 18 adjacent to gap 12 thereof.

From the foregoing, it should thus be appreciated that in accordance with the teachings of the present invention, the flux responsive magnetic head 10 is excited only during the sampling periods $s_p$ produced at a rate controlled by the frequency $f_s$ of oscillator 26, with the duration or length of each sampling period being controlled by the sample width control circuit 28. Frequency $f_s$ is controlled to be at least seven times greater than the highest frequency data passing by the gap 12 of head 10, while the length of each sampling period is controlled as a compromise between signal amplitude and power expended.

In one specific reduction to practice, the excitation frequency $f_e$ was 90 kc. while the sampling frequency $f_s$ and the sampling period $s_p$ were 200 c.p.s. and 100 microseconds respectively. Since the magnetic head 10 is only excited during discrete sampling periods, the excitation power required is considerably reduced as compared with prior art arrangements. In addition, by controlling flip-flop 24 to be in a particular one of its two stable states at the end of each sampling period, the core 11 of magnetic head 10 is always driven to its saturation state so that during a subsequent sampling period the first excitation signal supplied thereto brings the core out of saturation once per cycle of excitation frequency and thus the large noise signals produced when the core is driven to saturation are eliminated, since the heavy saturation current flows during the hold period $h_p$ and therefore does not affect the detection circuit 36 which is deactivated during such hold period $h_p$.

In conventional excitation circuits with DC bias, there are large peak saturation currents which flow during each cycle of the excitation frequency. These peak currents are difficult to control in conventional circuits, since slight temperature changes will in general change the FRMH characteristics and the AC excitation voltage. By the use of AC bias (sampling) the above difficulties of DC bias are avoided, thereby greatly improving signal-to-noise ratio. To be specific, with AC bias, the saturation currents which flow each cycle of excitation frequency are kept to the minimum required to bring the core 11 into and out of saturation. By minimizing the saturation currents, the signal-to-noise ratio is thereby improved. There is a heavy saturation current which flows at the end of each sample period, but at this time it cannot interfere with the signal.

The excitation of the core with a square wave of frequency $f_e$ (FIGURE 3) has been found to be advantageous in that the shape and amplitude of the excitation waveform could be easily controlled and thereby minimize undesired effects on the flux responsive magnetic head which, as is appreciated by those familiar with the art, is particularly sensitive to small changes in shape and amplitude of excitation waveforms.

Prior art literature on DC bias discusses the need for sinusoidal excitation, which is more difficult to generate and requires more power. A flux head, because it is driven to saturation, is a very nonlinear load for any excitation generator, and hence sinusoidal excitation is difficult to achieve.

Attention is now directed to FIGURES 4($a$), ($b$) and 5 which are schematic diagrams of the circuitry shown in FIGURE 2 which has actually been reduced to practice. In FIGURES 4($a$) and 4($b$) are diagrammed the source of excitation frequency 22 and the two serially connected flip-flops 23 and 24, as well as the sample frequency oscillator 26 and the sample width control circuit 28. FIGURE 5 is a schematic diagram of the excitation driver 25, flux responsive magnetic head 10, and the output circuitry coupled to the output winding 16 thereof. The circuitry in FIGURES 4($a$), 4($b$) and 5 is presented as one example of a specific arrangement, it being appreciated that other circuit arrangements may be employed in practicing the teachings of the invention, and therefore the following is presented as an example of one practical embodiment, rather than as a limitation on the teachings disclosed herein.

As seen from FIGURE 4($a$), the source of excitation frequency 22 comprises an oscillator which includes a transistor $Q_1$ having its collector connected through secondary winding 42 of a transformer $T_1$ and a resistor $R_1$ to a source of positive potential such as +14 volts. A diode $D_1$ is connected in parallel across winding 42. Similarly, serially connected resistor $R_2$, primary winding 44 of transformer $T_1$, and a capacitor $C_1$ are connected between the base of transistor $Q_1$ and the junction point of resistor $R_1$ and winding 42. A capacitor $C_2$ is connected across resistor $R_2$, with the junction point therebetween being connected to the emitter of $Q_1$. The base of transistor $Q_1$ is connected through a resistor $R_3$ to a source of negative potential such as −14 volts, while the emitter of $Q_1$ is connected to a source of negative potential such as −7 volts. The base of transistor $Q_1$ is connected through serially connected resistor $R_4$ and variable resistor $R_5$ by means of line 46 to flip-flop 24, to be controlled thereby in a manner to be described hereafter in detail.

Line 46 is also used to connect flip-flop 24 to flip-flop 23 which, as shown in FIGURE 4($a$), receives the output of source 22 from the collector of transistor $Q_1$. Flip-flop 23 is shown comprising a pair of transistors $Q_2$ and $Q_3$ connected in a conventional flip-flop arrangement and a transistor $Q_4$ which is used to enable the flip-flop 23 at the beginning of each sampling period $s_p$ and disable the flip-flop at the beginning of each hold period $h_p$. The collector of each of transistors $Q_2$ and $Q_3$ is connected to the positive potential of 14 volts through a resistor $R_6$ and to the base of the opposite transistor through a resistor $R_7$ shunted by the serially connected resistor $R_8$ and capacitor $C_3$. The base of each of transistors $Q_2$ and $Q_3$ is also connected to the source of −14 volts through a resistor $R_9$, while the output of oscillator 22 is connected to the junction of resistors $R_8$ and capacitor $C_3$ through diodes $D_2$.

The operation of flip-flop 23 is controlled by transistor $Q_4$, having its collector connected to the emitters of both transistors $Q_2$ and $Q_3$, with the emitter of $Q_4$ being connected directly to the source of −7 volts. The base of $Q_4$ which is connected to the same source of negative potential through a resistor $R_{10}$ is also connected to line 46 through a resistor $R_{10a}$ shunted by a capacitor $C_4$.

When transistor $Q_4$ is in a conducting state, hereafter also referred to as being on, the collector thereof is substantially at the −7 volts potential, disregarding the collector-to-emitter voltage drop thereacross, so that the transistors $Q_2$ and $Q_3$ forming a part of flip-flop 23, are free to be switched between their two stable states, thereby enabling flip-flop 23 to operate in a conventional manner. However, when the base of control transistor $Q_4$ is pulled to −7 volts, $Q_4$ is switched to its nonconducting state, hereafter referred to as being off, at which time the collector thereof is no longer at the −7 volts potential, inhibiting transistors $Q_2$ and $Q_3$ from their normal flip-flop mode of operation. The change in potential of the base of control transistor $Q_4$ is provided, via line 46, from the output of the sample width control circuit 28 to be described hereafter.

The control circuit 28 as seen in FIGURE 4($b$) includes a pair of transistors $Q_5$ and $Q_6$ operating in a bistable arrangement. The emitters of both transistors are connected to a source of −7 volts. The base of $Q_5$ is connected through two parallel arrangements, one of which comprises of serially connected resistors $R_{11}$ and $R_{12}$ and the other arrangement includes a resistor $R_{13}$ connected in series with a capacitor $C_5$, with the junction therebetween being connected to the collector of transistor $Q_6$. The collector of $Q_5$ is in turn connected to the source of +14 volts through a resistor $R_{14}$, and to the base of transistor $Q_6$ through a resistor $R_{15}$. The collector of $Q_5$ is also directly connected to the base of a transistor $Q_7$, having its collector connected through a resistor $R_{16}$, to the source of +14 volts and its emitter connected to its base through a diode $D_3$. The base of transistor $Q_7$ is connected through serially connected resistors $R_{15}$ and $R_{17}$ to the source of −14 volts. The output point of control circuit 28 may be thought of as the emitter of $Q_7$ while the input point thereof may be thought of as the junction point between the resistors $R_{11}$ and $R_{12}$ which is connected to the output of the sample frequency oscillator 26.

The schematic of sample frequency oscillator 26 is similar to that of the source of excitation frequency 22 in that it includes a transistor $Q_8$ and a transformer $T_2$, which are analogous to the transistor $Q_1$ and transformer $T_1$ of source 22. Winding 52 of transmormer $T_2$ is connected in series with a resistor $R_{18}$ between the collector of $Q_8$ and the source of positive potential of +14 volts, with the junction thereof being connected to the base of $Q_8$ through serially connected resistor $R_{19}$ and variable resistor $R_{20}$. Resistor $R_{20}$ is used to adjust the frequency output of oscillator 26. Winding 54 of transformer $T_2$ is connected in series with a capacitor $C_6$ between the base of $Q_8$ and the source of −7 volts, the latter source being also connected to the junction of winding 52 and resistor $R_{18}$ through a capacitor $C_7$. A diode $D_4$ analogous to diode $D_1$ in source 22 is connected in parallel across winding 52, while a decoupling capacitor $C_6$ is used to couple the oscillator 26 to the sample width control circuit 28.

The schematic of flip-flop 24 is similar to that of flip-flop 23 hereinbefore described and shown in FIGURE 4($a$), with transistors $Q_9$ and $Q_{10}$ performing analogous operation of transistors $Q_2$ and $Q_3$ in flip-flop 23. Similarly, resistors $R_{21}$, $R_{22}$, $R_{23}$, and $R_{24}$ are analogous to resistors $R_6$, $R_7$, $R_8$, and $R_9$ in flip-flop 23. Also, capacitors $C_9$ are analogous to capacitors $C_3$ in flip-flop 23 and diodes $D_5$ are analogous to diodes $D_2$. However, whereas the emitters of transistors $Q_2$ and $Q_3$ of flip-flop 23 are connected to the −7 volts through the collector-emitter junction of control transistor $Q_4$, the emitters of $Q_9$ and $Q_{10}$ of flip-flop 24 are directly connected to such potential source. Diodes $D_5$ of flip-flop 24, the cathodes of which serve as the input terminal of flip-flop 24, are connected by means of a line 56 to the collector of one of the transistors such as $Q_2$ of flip-flop 23 which may be thought of as one of the outputs of the flip-flop. In addition, the collector of $Q_{10}$ in flip-flop 24 is shown connected through a diode $D_6$ to the emitter of transistor $Q_7$, while the collector of $Q_9$ is connected to a base of a transistor $Q_{11}$ and the cathode of a diode $D_7$ having its anode connected to the emitter of $Q_{11}$. The collector of the latter-mentioned transistor is connected through a resistor $R_{25}$ to the source of positive 14 volts.

In operation, in the absence of sample frequency oscillator 26 and sample width control circuit 28, the output frequency $f_1$ of source 22 is divided by flip-flops 23 and 24 so that the output at the emitter of transistor $Q_{11}$ is in essence a square wave of a frequency equal to one-fourth the frequency $f_1$. However, sample frequency oscillator 26 provides signals at a rate or frequency $f_s$ to the sample width control circuit 28. At the beginning of each cycle or sampling period, capacitor $C_5$ is being charged up at a rate determined by the resistive values of resistors $R_{11}$ and $R_{12}$ and the capacitance of $C_5$, so that at some point during the cycle of the signal from oscillator 26, the voltage on the base of transistor $Q_5$ is sufficient to switch $Q_5$ on. When $Q_5$ is switched on, the collector thereof is substantially at −7 volts thereby disabling or switching off transistor $Q_7$. This in turn causes the potential at the emitter thereof to be at substantially −7 volts. Since the emitter of $Q_7$ and the base of control transistor $Q_4$ are connected through resistor $R_{10}$ via line 46, when the emitter of $Q_7$ is pulled to −7 volts, the base of $Q_4$ is similarly at −7 volts, thereby disabling transistor $Q_4$. As a result, the collector of $Q_4$ and the emitters of $Q_2$ and $Q_3$ are no longer at substantially −7 volts, resulting in the disabling of flip-flop 23. A similar effect occurs in transistor $Q_1$ of the source of excitation frequency 22 since the base of $Q_1$ is connected through resistors $R_4$ and $R_5$ to the emitter of $Q_7$. Thus, the portion during each cycle of the signal from the sample frequency oscillator 26 during which flip-flop 23 is enabled, i.e. the length of the sampling period, is controlled by the RC constant of resistors $R_{11}$ and $R_{12}$ and $C_5$, whereas the rate of the sampling periods is a function of the frequency $f_s$ of oscillator 26.

It should be noted that the collector of transistor $Q_{10}$, being one of the two transistors of flip-flop 24 is connected through diode $D_6$ to the emitter of $Q_7$, so that at the end of each sampling period, when emitter of $Q_7$ is at substantially −7 volts potential, the collector of $Q_{10}$ is similarly at about the same potential, thereby causing $Q_{10}$ to be off or in a nonconducting state. This in turn causes $Q_9$ to be in a conducting or on state which switches $Q_{11}$ on, so that the output of the emitter thereof, representing the output of flip-flop 24 is the same at the end of each sampling period.

The output of flip-flop 24, i.e. the emitter terminal of $Q_{11}$ is connected to the excitation driver 25 (FIGURE 5) which is in turn connected through a capacitor $C_{10}$ and a resistor $R_{26}$ to the excitation winding 14 of flux responsive head 10. The excitation winding 14 is shown shunted by a capacitor $C_{11}$. Since the output of flip-flop 24 at the end of each sampling period is of the same polarity, the magnetization state of the core 11 (FIGURE 1) to which it is driven at the end of the sampling period by the excitation driver 25 is the same. The output polarity of flip-flop 24 at the end of each sampling period is chosen so that at the end of the period the core is driven to its saturated state. Consequently, during a succeeding sampling period, the first excitation currents supplied thereto cause the core to be switched to its unsaturated state.

In FIGURE 5, excitation driver 25 is shown comprising four transistors $Q_{12}$ through $Q_{15}$. The emitter of $Q_{11}$ forming a part of flip-flop 24 is directly connected to the base of $Q_{13}$ and to the base of $Q_{12}$ through a resistor $R_{27}$. The collector of $Q_{12}$ is connected through series resistors $R_{28}$ and $R_{29}$ to the source of −14 volts, with the junction thereof being directly connected to the base of $Q_{15}$ and through a diode $D_8$ to the emitter of $Q_{15}$ which is in turn also connected to the source of −7 volts. The collector of $Q_{13}$ is connected to the base of $Q_{14}$ and through a resistor $R_{30}$ to the source of +14 volts, with the emitter of $Q_{14}$ being connected through a reference voltage diode, such as a Zener diode $Z_1$, to the same positive potential source. The emitter of $Q_{12}$ is connected to a reference potential such as ground, while the emitter of $Q_{13}$ and the collector of $Q_{14}$ are connected to an anode terminal of a diode $D_9$, having its cathode connected to the collector of $Q_{15}$ and to one terminal of capacitor $C_{10}$. The operation of the circuitry herebefore described may be summarized as providing a signal frequency of a frequency $f_1$ which, after being divided by two flip-flops, is supplied through an excitation driver to the excitation winding as a square wave of frequency $f_e$ where $f_e = f_1/4$.

The excitation frequency instead of being continuously supplied to the excitation winding, is only limited to sampling periods $s_p$ at a preselected sampling rate $f_s$. The sampling rate is a function of the frequency output of the sample frequency oscillator 26. The length of the sampling period $s_p$ is controlled by the sample width control circuit 28 which at a selected point or time during the period of each signal from the sample frequency oscillator causes a control transistor to inhibit source of frequency $f_1$ and the first of the two flip-flops. Thus a substantial reduction in power requirement is realized.

In addition, the control circuit 28, at the end of each sample period, causes the second flip-flop 24 to be driven to a selected one of its two stable states so that the core is driven to magnetic saturation at the end of the sample period and remains saturated until the beginning of the next sample period. It may be noted from schematic on FIGURE 5 that the saturation current ceases to flow when capacitor $C_{10}$ has been discharged, thus conserving power. Such an arrangement provides the effect of the DC bias source used in prior art FRMH arrangements without the need for an actual separate bias source. Such arrangement further provides for a considerable improvement in signal-to-noise ratio.

Attention is again directed to FIGURE 5 wherein the output winding 16 of the FRMH 10 is shown connected to the detection and output circuitry, represented in FIGURE 2 by amplifier 32, the detection and hold circuit 36, and output amplifier 38. The winding 16 is shown connected to a base of an amplifying transistor $Q_{16}$ having its collector connected to the +14 volts source while its emitter is connected to −14 volts through a resistor $R_{30a}$ and to the base of a transistor $Q_{17}$. The latter transistor which together with transistor $Q_{18}$ acts as a phase splitter has its emitter connected to the collector of $Q_{18}$ and through resistor $R_{31}$ to −14 volts. The collector of the same transistor is connected through a resistor $R_{32}$ to the +14 volts and to the base of $Q_{18}$, which has its emitter connected through a resistor $R_{33}$ to the +14 volts source.

The emitters of the phase splitting transistors $Q_{17}$ and $Q_{18}$ are connected through respective capacitors $C_{12}$ and $C_{13}$ to the emitters of transistors $Q_{19}$ and $Q_{20}$ respectively. The latter transistors are interconnected so that they perform the function of the second harmonic phase detector 36 (FIGURE 2). As seen, bases of $Q_{19}$ and $Q_{20}$ are connected through resistors $R_{34}$ and $R_{35}$ to the collectors of $Q_2$ and $Q_3$ of flip-flop 23 [see FIGURE 4(*a*)], while their collectors are tied together as well as to ground, and one terminal of a holding capacitor $C_{14}$. The other side of capacitor $C_{14}$ is connected through equal resistors $R_{36}$ and $R_{37}$ to the emitters of the transistors $Q_{19}$ and $Q_{20}$. Diodes $D_{10}$ and $D_{11}$ are shunted across resistors $R_{34}$ and $R_{35}$ respectively. Recalling that the excitation frequency $f_s$ supplied to excitation winding 14 is only one-half the frequency of operation transistors $Q_2$ and $Q_3$. Thus each of transistors $Q_{19}$ and $Q_{20}$ is switched on and off twice for each excitation cycle. As a result, the fundamental frequency or harmonic, i.e. the excitation frequency $f_e$, is inhibited. However, second and higher harmonics are detected charging the capacitor $C_{14}$ to a voltage which is proportional to the signal from magnetic head 10 which is in turn a function of the flux in the tape 18 (FIGURE 1) near gap 12 of the head.

The charging is accomplished through either of resistors $R_{36}$ or $R_{37}$. Then, at the end of each sampling period $s_p$, flip-flop 23 is disabled by the control transistor $Q_4$, FIGURE 4). As a result, the collectors of $Q_2$ and $Q_3$ of flip-flop 23 approach +14 volts which in turn switches off transistors $Q_{19}$ and $Q_{20}$. Capacitor $C_{14}$ which may be thought of as the hold capacitor, is prevented from discharging through resistors $R_{36}$ and $R_{37}$ since transistors $Q_{19}$ and $Q_{20}$ in their off state present a high impedance thereto so that any discharge is of very small magnitude. As a result, the charge on $C_{14}$ remains nearly constant during the hold periods $h_p$, it being affected only during the sampling periods $s_p$.

Capacitor $C_{14}$ is connected through a resistor $R_{38}$ and a bypass capacitor $C_{15}$ to the low frequency output amplifier 38 which amplifies the voltage on capacitor $C_{14}$. The output of the amplifier 38 may then be supplied to a digital data reconstruct circuit (if desired) which, as a function of the amplified voltage on hold capacitor $C_{14}$, reconstructs the data stored in tape 18 in the form of magnetic flux. The output of amplifier 38 may also be supplied to an AC analog amplifier, if desired.

In the specific schematic arrangement diagrammed in FIGURES 4 and 5, the following is a list of component values and types actually used in one example of reducing the invention to practice.

| Component | Type | Component | Type |
|---|---|---|---|
| $Q_1$ | 2N708 | $R_{10a}$ | 15K |
| $Q_2$ | 2N708 | $R_{11}$ | 8.2K |
| $Q_3$ | 2N708 | $R_{12}$ | 47K |
| $Q_4$ | 2N708 | $R_{13}$ | 12K |
| $Q_5$ | 2N708 | $R_{14}$ | 447K |
| $Q_6$ | 2N708 | $R_{15}$ | 120K |
| $Q_7$ | 2N708 | $R_{16}$ | 1.2K |
| $Q_8$ | 2N708 | $R_{17}$ | 820K |
| $Q_9$ | 2N708 | $R_{18}$ | 2.2K |
| $Q_{10}$ | 2N708 | $R_{19}$ | 330K |
| $Q_{11}$ | 2N708 | $R_{20}$ | 180K |
| $Q_{12}$ | 2N1131 | $R_{21}$ | 22K |
| $Q_{13}$ | 2N708 | $R_{22}$ | 82K |
| $Q_{14}$ | 2N1131 | $R_{23}$ | 82K |
| $Q_{15}$ | 2N2195 | $R_{24}$ | 820K |
| $Q_{16}$ | 2N930 | $R_{25}$ | 1.2K |
| $Q_{17}$ | 2N708 | $R_{26}$ | 100Ω |
| $Q_{18}$ | 2N8603 | $R_{27}$ | 3.9K |
| $Q_{19}$ | 2N971 | $R_{28}$ | 330K |
| $Q_{20}$ | 2N941 | $R_{29}$ | 33K |
| $R_1$ | 6.8K | $R_{30}$ | 33K |
| $R_2$ | 6.8K | $R_{30a}$ | 150K |
| $R_3$ | 1M | $R_{31}$ | 4.7K |
| $R_4$ | 10K | $R_{32}$ | 820K |
| $R_5$ | 50K | $R_{33}$ | 4.7K |
| $R_6$ | 4.7K | $R_{34}$ | 8.2K |
| $R_7$ | 22K | $R_{35}$ | 8.2K |
| $R_8$ | 22K | $R_{36}$ | 10K |
| $R_9$ | 220K | $R_{37}$ | 10K |
| $R_{10}$ | 820K | $R_{38}$ | 4.7K |

| Component | | Type |
|---|---|---|
| $C_1$ | μfd | .001 |
| $C_2$ | μfd | .1 |
| $C_3$ | pfd | 15 |
| $C_4$ | pfd | 22 |
| $C_5$ | μfd | .05 |
| $C_6$ | μfd | .1 |
| $C_7$ | μfd | .1 |
| $C_8$ | μfd | .002 |
| $C_9$ | pfd | 22 |
| $C_{10}$ | μfd | 1 |
| $C_{11}$ | μfd | .03 |
| $C_{12}$ | pfd | 220 |
| $C_{13}$ | pfd | 220 |
| $C_{14}$ | μfd | .01 |
| $C_{15}$ | μfd | .45 |
| $Z_1$ | volts | 6 |

| | |
|---|---|
| $T_1$ | Pulse transformer 1 to 4 turns |
| $T_2$ | ratio Aladdin 94–133. |
| Diodes $D_1$ | Aladdin 90–631. |
| through $D_{11}$ | 1N916. |
| Magnetic head | Manufactured by Brush-Clevite Corporation. |

The values of $R_{26}$ and $C_{11}$ are determined as a function of the head characteristics. With the above-listed components, the frequency output of source 22, i.e. $f_1$, was 400 kc. Thus $f_e$ was 100 kc. The sampling rate or output frequency of oscillator 26 was 200 c.p.s. and the sampling period $s_p$ was 100 microseconds.

There has accordingly been shown and described herein a novel excitation and detection circuit for use with a flux responsive magnetic head. By employing the teachings of the invention, a magnetic head is excited during sampling periods occurring at a selected rate rather than continuously. This results in much lower power requirements. Also the excitation during discrete sampling periods enables the use of circuitry such as the flip-flop 24 to be driven to a particular one of its two bistable states so that the core of the magnetic head is driven to saturation at the end of each sampling period, thereby eliminating the need for a separate DC bias source.

The novel circuit of the present invention also includes a new detection circuit in which a second harmonic phase detector is operated to control a hold capacitor to charge up during the sampling periods to a charge or voltage related to the magnetic flux sensed by the head. Then during hold periods, i.e. between sampling periods, the phase detector is disabled, preventing the voltage on the hold capacitor from changing materially.

What is claimed is:

1. A circuit for use with a flux responsive magnetic reproduction head having an excitation winding and a signal winding wound thereabout and defining a gap for providing an output signal in response to an excitation signal in said excitation winding as a function of magnetic flux in a magnetic member adjacent said gap, said circuit comprising:

a source of excitation signals of a preselected excitation frequency;

first means for supplying said excitation signals to the excitation winding of said head;

second means for defining successive sampling periods at a predetermined sampling frequency;

third means for limiting the supply of said excitation signals to said excitation winding to said sampling periods; and output means for detecting the output signals induced in said signal winding during said sampling periods.

2. The circuit defined in claim 1 wherein said first means comprises an oscillator for providing excitation signals at a first frequency greater than said excitation frequency:

frequency dividing means for reducing the frequency of said excitation signals from said first frequency to said excitation frequency;

an excitation driver for driving said excitation winding with said excitation signals of said excitation frequency; and means in said third means for inhibiting said frequency dividing means at the end of each sampling period to limit the supply of said excitation signals to said excitation winding to the sampling periods.

3. The circuit defined in claim 2 wherein said third means includes an oscillator for providing signals at said sampling frequency and sample width defining means responsive to each of said signals for defining a sampling period in response thereto.

4. The circuit defined in claim 3 wherein said sample width defining means includes a flip-flop and resistive and capacitive means for controlling said flip-flop to be in one of its two stable states at the end of each sampling period.

5. The circuit defined in claim 1 wherein said output means includes a second harmonic phase detector and a charge holding circuit responsive to the output signals induced in the output winding of said head during each sampling period.

6. The circuit defined in claim 2 wherein said output means includes a second harmonic phase detector and a charge holding circuit responsive to the output signals induced in the output winding of said head during each sampling period, said circuit further including means responsive to said frequency dividing means for decoupling said charge holding circuit from said second harmonic phase detector between the end of one sampling period and the beginning of a succeeding sampling period.

7. In an excitation circuit of a flux responsive magnetic reproduction head having an excitation winding for receiving from a source of excitation signals of a first frequency and an output winding wherein a signal is induced in response to each excitation signal as a function of the magnetic flux in a magnetic tape adjacent a gap defined by said head, the improvement comprising:

a source of excitation signals including a first frequency oscillator for generating signals at a second frequency greater than said first frequency;

frequency dividing means for reducing the frequency of the signals from said first frequency oscillator from said second frequency to said first frequency;

an excitation driver for driving said excitation winding with the signals of said first frequency;

first means for defining a series of sampling periods adjacent sampling periods being separated by a hold period;

second means for inhibiting said frequency dividing means during said hold periods whereby said excitation driver drives said excitation winding with signals of said first frequency only during each sampling period; and an output circuit including a second harmonic phase detector coupled to the output winding of said head and means energizable during each sampling period for providing an output as a function of the magnetic flux in a magnetic member adjacent said gap during said sampling period.

8. The circuit defined in claim 7 wherein said frequency dividing means includes first and second flip-flop serially connected between said first oscillator and said excitation driver, said second means including a transistor connected to said first flip-flop and operable in either a conducting or nonconducting state, said transistor being switched to its nonconducting state during each hold period to inhibit said flip-flop from responding to signals from said first oscillator.

9. The circuit defined in claim 8 wherein said first means includes a second oscillator for generating a series of signals at a sampling frequency $f_x$, and sampling period defining means responsive to each signal of said second oscillator for dividing the period thereof into a sampling period and a hold period, said latter means including a capacitor and a bistable circuit switchable to a selected state at the end of each sampling period, said circuit including means coupling said bistable circuit to said second flip-flop whereby said second flip-flop is driven to a selected one of its two states at the end of each sampling period to maintain said head in a magnetically saturated state during each hold period.

10. The circuit defined in claim 9 wherein said output means includes a capacitor coupled to the output of said second harmonic phase detector and to said first flip-flop of said frequency dividing means whereby said capacitor is charged during each sampling period as a function of the flux at said head gap and is substantially decoupled from said phase detector during said hold period when said first flip-flop is inhibited from responding to signals from said first oscillator.

References Cited

UNITED STATES PATENTS

| | | | |
|---|---|---|---|
| 3,011,160 | 11/1961 | Gratian | 179—100.2 |
| 3,164,684 | 1/1965 | Weigand | 179—100.2 |
| 3,295,118 | 12/1966 | Brown | 179—100.2 |

BERNARD KONICK, *Primary Examiner.*

J. P. MULLINS, *Assistant Examiner.*